(12) United States Patent
Chengson

(10) Patent No.: US 6,646,982 B1
(45) Date of Patent: Nov. 11, 2003

(54) REDUNDANT SOURCE SYNCHRONOUS BUSSES

(75) Inventor: David Paul Chengson, Scotts Valley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/521,281

(22) Filed: Mar. 7, 2000

(51) Int. Cl.⁷ .............................................. G01R 31/08
(52) U.S. Cl. ...................... 370/217; 370/228; 710/131
(58) Field of Search ...................... 370/216, 217–220, 370/225, 227, 228, 242, 248, 250, 254, 438, 503; 710/38, 100, 104–6, 126, 128, 129, 131; 714/47, 48, 56

(56) References Cited

U.S. PATENT DOCUMENTS

| | | | | |
|---|---|---|---|---|
| 5,843,799 A | * | 12/1998 | Hsu et al. ..................... | 438/6 |
| 6,393,504 B1 | * | 5/2002 | Leung et al. ................. | 710/104 |
| 6,400,771 B1 | * | 6/2002 | Humphrey .................. | 375/257 |
| 6,433,600 B2 | * | 8/2002 | Ilkbahar ..................... | 327/198 |
| 6,483,755 B2 | * | 11/2002 | Leung et al. ................ | 365/189.05 |
| 6,510,503 B2 | * | 1/2003 | Gillingham et al. ........ | 711/167 |

* cited by examiner

Primary Examiner—David Vincent
(74) Attorney, Agent, or Firm—Harrity & Snyder, LLP

(57) ABSTRACT

A system and method for providing redundant source synchronous communication links. The system includes a redundant source synchronous communications bus coupling a first component and a second component. The first component includes a clock source and one or more data channels where each data channel includes a transmitter. The second component includes redundant termination systems for receiving signals generated in each data channel. The redundant source synchronous communications bus includes a plurality of first, second and third transmission line portions. Each first transmission line portion is coupled to a transmitter in the first component. The bus further includes a like plurality of transistor switches. Each transistor switch includes an input port, two output ports and primary and redundant switches operable for switching a signal received from the first transmission line portion at the input port to either of the two output ports. Each output port is coupled by the second and third transmission line portions, respectively, to the redundant termination systems in the second component.

8 Claims, 4 Drawing Sheets

REDUNDANT SOURCE SYNCHRONOUS BUSSES

The invention relates generally to electrical circuits, and more particularly to communication busses and switching circuits.

BACKGROUND

A communications bus can be used to couple plural electrical circuit elements. Optimally, the communications bus should be transparent to the devices that it interconnects. A source synchronous communications bus can be used to couple a source device to one or more receiving devices. In a source synchronous communications link, the source device provides a sourcing clock signal that can be used by a receiving device to synchronize the reading of data from the communications link.

Electrical designs for mission critical systems must provide reliability. Redundancy can be built into a mission critical system to provide a measure of reliability. For example, a system designer may provide a design that includes a master system that is supported by a fully redundant slave system. In the event a failure arises in the master system, the slave system can be utilized to support system requirements. However, the transition from the master system to the slave system can cause problems. Depending on the system design requirements, the slave system may be required to take over immediately so that no down time is experienced. Alternatively, the master system may need to be taken off line prior to the starting of the slave system. Information may be required to be shared between the master and slave system in order to support the transition. Timing and control issues and glitches are some of the problems that must be resolved when introducing redundancy to a system.

SUMMARY

In one aspect, the invention provides a redundant source synchronous communications bus coupling a first component and a second component. The first component includes a clock source and one or more data channels where each data channel includes a transmitter. The second component includes redundant termination systems for receiving signals generated in each data channel. The redundant source synchronous communications bus includes a plurality of first, second and third transmission line portions. Each first transmission line portion is coupled to a transmitter in the first component. The bus further includes a like plurality of transistor switches. Each transistor switch includes an input port, two output ports and primary and redundant switches operable for switching a signal received from the first transmission line portion at the input port to either of the two output ports. Each output port is coupled by the second and third transmission line portions, respectively, to the redundant termination systems in the second component.

Aspects of the invention can include one or more of the following features. The redundant source synchronous bus can include a like plurality of bias circuits. Each bias circuit can be coupled between an output of a transmitter for a data channel and ground. The redundant source synchronous bus can include a like plurality of AC coupling capacitors. Each AC coupling capacitor can couple the output of a transmitter for a data channel to one end of a first transmission line portion, where the second end of the first transmission line portion is coupled to the input port of a transistor switch. A length of each first transmission line portion can vary while an overall length between the first and second component is approximately equal for all data channels.

In another aspect, the invention provides a system for coupling a first component and a second component. The first component includes plural redundant source synchronous communication links. Each link includes a clock source and one or more data channels where each data channel includes a transmitter. The second component includes plural redundant termination systems for receiving signals generated in each data channel. The system includes means for staggering signals generated on each source synchronous communication bus so that no two of the plural source synchronous communications busses are sourcing signals at a same time.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
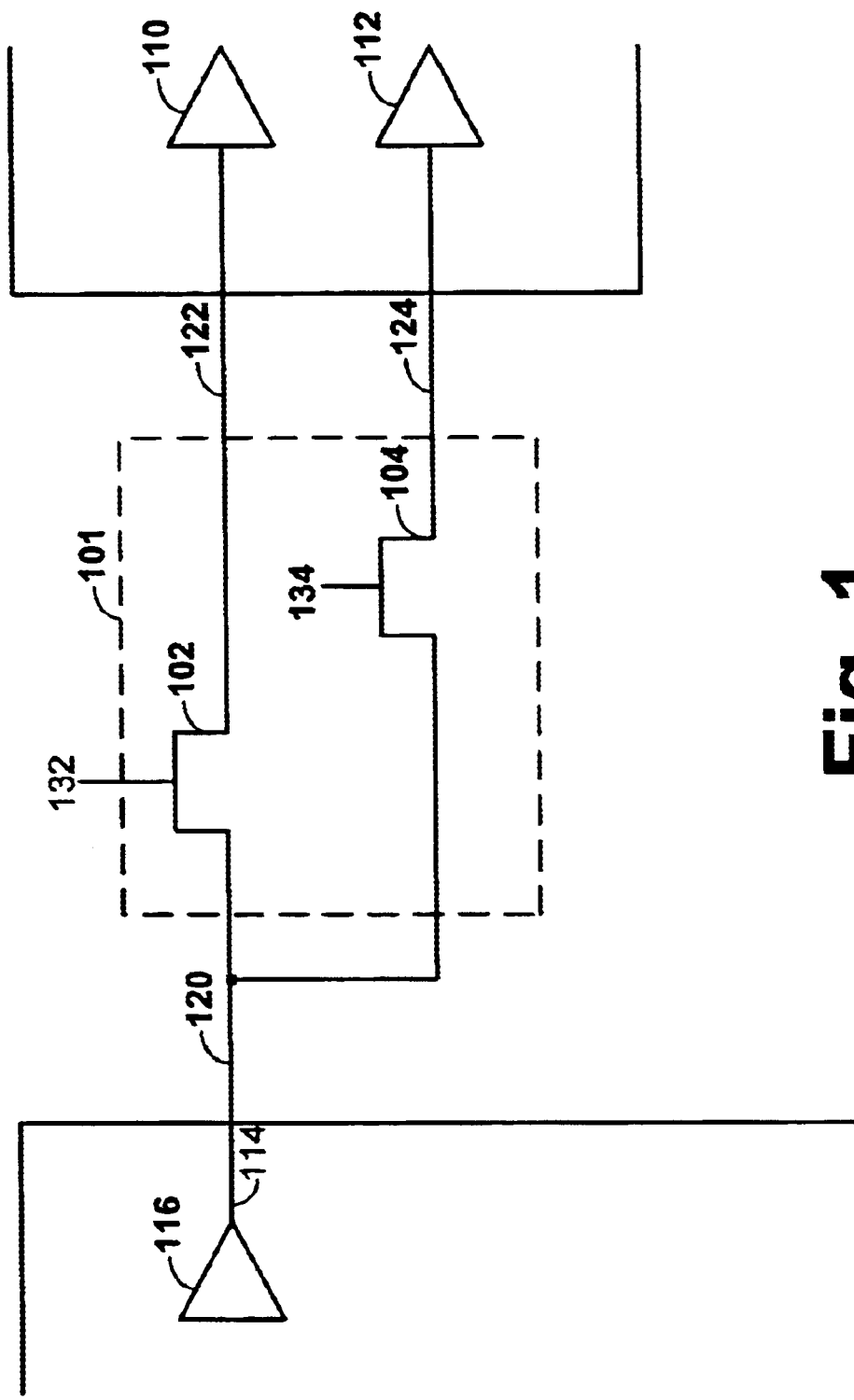
FIG. 1 is a schematic block diagram of a transistor switch.

A system is provided that includes redundant source synchronous busses for interconnecting plural devices. The redundant source synchronous busses are configured using a modified transistor switch circuit. A transistor switch is an electrical device that can be formed from an N-channel field effect transistor (FET). Referring to FIG. 1, a schematic block diagram of a transistor switch is shown. The device includes two FETs 102 and 104. An input signal 114 from a source device 116 can be coupled by a first transmission line 120 to the source of each of FET 102 and 104. The drain of FET 102 is coupled by a second transmission line 122 to a receiving device 110. The drain of FET 104 is coupled by a third transmission line 124 to a second receiving device 112. While devices 116, 110 and 112 have been provided certain labels (i.e., "source" and "receiving"), the communication links between them can be bi-directional. As such each device can be configured to send or receive data signals. Each of the gates of FET 102 and set 104 are coupled to control signals 132 and 134, respectively. In one implementation, a single control signal is provided to the gates of FETs 102 and 104. The single control signal can be inverted for one of the gates, or alternatively, the FET pair can be constructed to operate at different bias levels (e.g., one high level and one low level). In operation, the transistor switch operates to switch the input signal 114 from source device 116 to one of the receiving devices (110 or 112) depending on the bias of the gates of the respective FETs 102 and 104.

Figure 2:
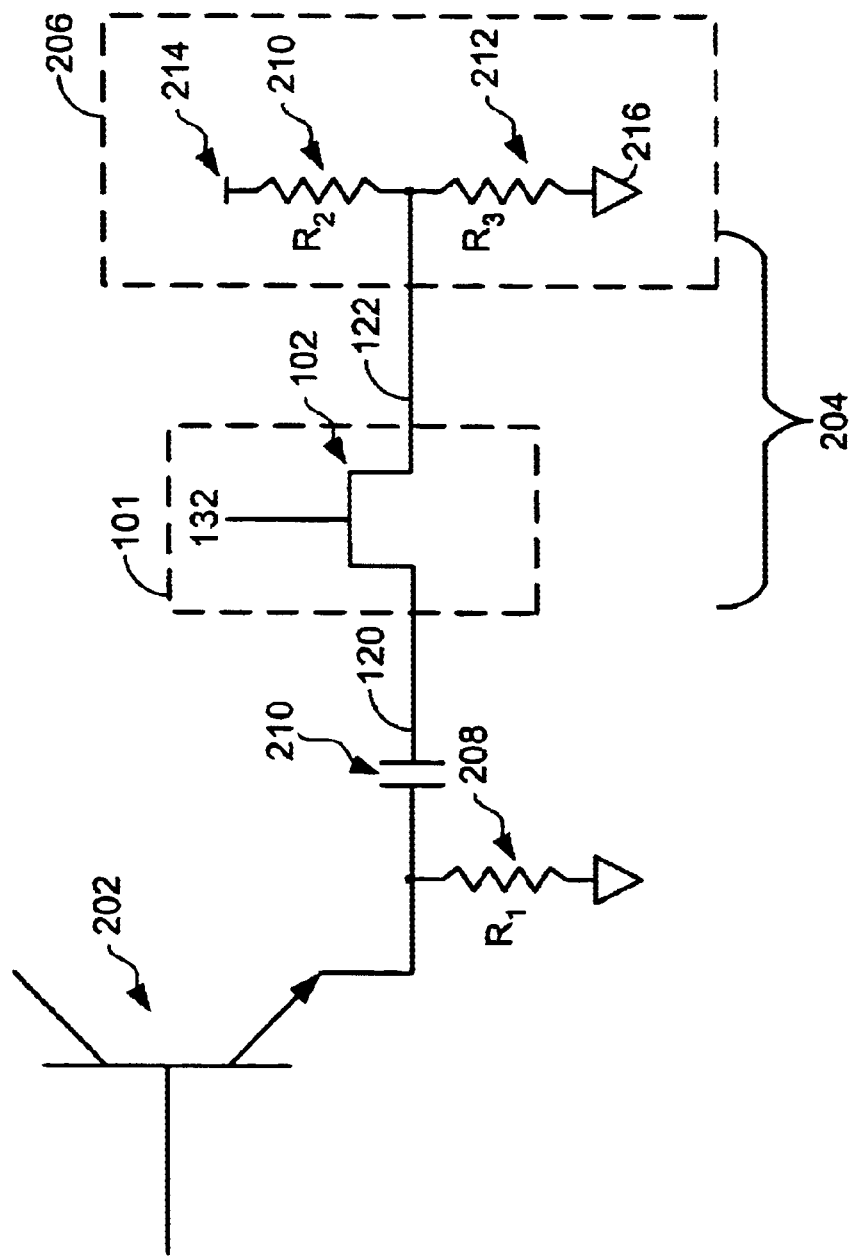
FIG. 2 is a schematic block diagram of a modified transistor switch.

Two characteristics of a N-channel FET are the device's parasitic capacitance and the "ON-resistance". The N-channel FET circuit design includes significant parasitic capacitance that can result in reflection noise on the transmission lines (120, 122 and 124). Referring now to FIG. 2, a schematic diagram of a modified transistor switch configuration is show. An emitter-follower output transistor 202 is coupled by a transmission line 204 to a termination 206 in a receiving device 110. Transmission line 204 includes two separate transmission line pieces 120 and 122 coupled by FET 102. A first transmission line 120 is coupled between the emitter-follower output transistor 202 and the source of FET 102. The second transmission line 122 is coupled between the drain of FET 102 and the termination 206. Termination 206 can be represented by a pair of series resistors 210 and 212 that are coupled between a voltage source 214 and ground 216. In one implementation, resistors 210 and 212 are 137 ohms and 81 ohms respectively producing an equivalent 50 ohm termination.

Typically, the emitter-follower transistor 202 in source device 102 is biased in a linear active region and timing skews may result as transistor biasing is changed. Since this phenomenon occurs only on the falling high or low edge transitions, timing skews are introduced in a transition direction sensitive manner. A bias circuit 208 can be used to overcome this problem of transition direction timing skew. In one implementation, bias circuit 208 includes a 100 ohm resistor coupled between the emitter-follower 202 output and ground. Bias circuit 208 requires a bias current that can affect the current requirements of the termination circuit 208. As is well known in the art, the termination circuit 206 is provided to prevent reflection noises from being generated at the far end of the transmission line. However the sum of the resistances of the source bias circuit (bias circuit 208), the ON-resistance of the FET 102 and the termination circuit creates a lower DC current which flows through FET 102 creating a significantly lower potential high and low levels when using the transmission line. To avoid these problems, a direct current (DC) blocking capacitor 210 is coupled between the output of the emitter-follower transistor 202 and the first transmission line 120. The output of the emitter-follower transistor 202 is AC coupled to the transmission line to prevent DC current flowing through FET 102 (e.g., AC coupling). In one implementation the capacitor 210 is sized to be approximately 15 nF.

Figure 3:
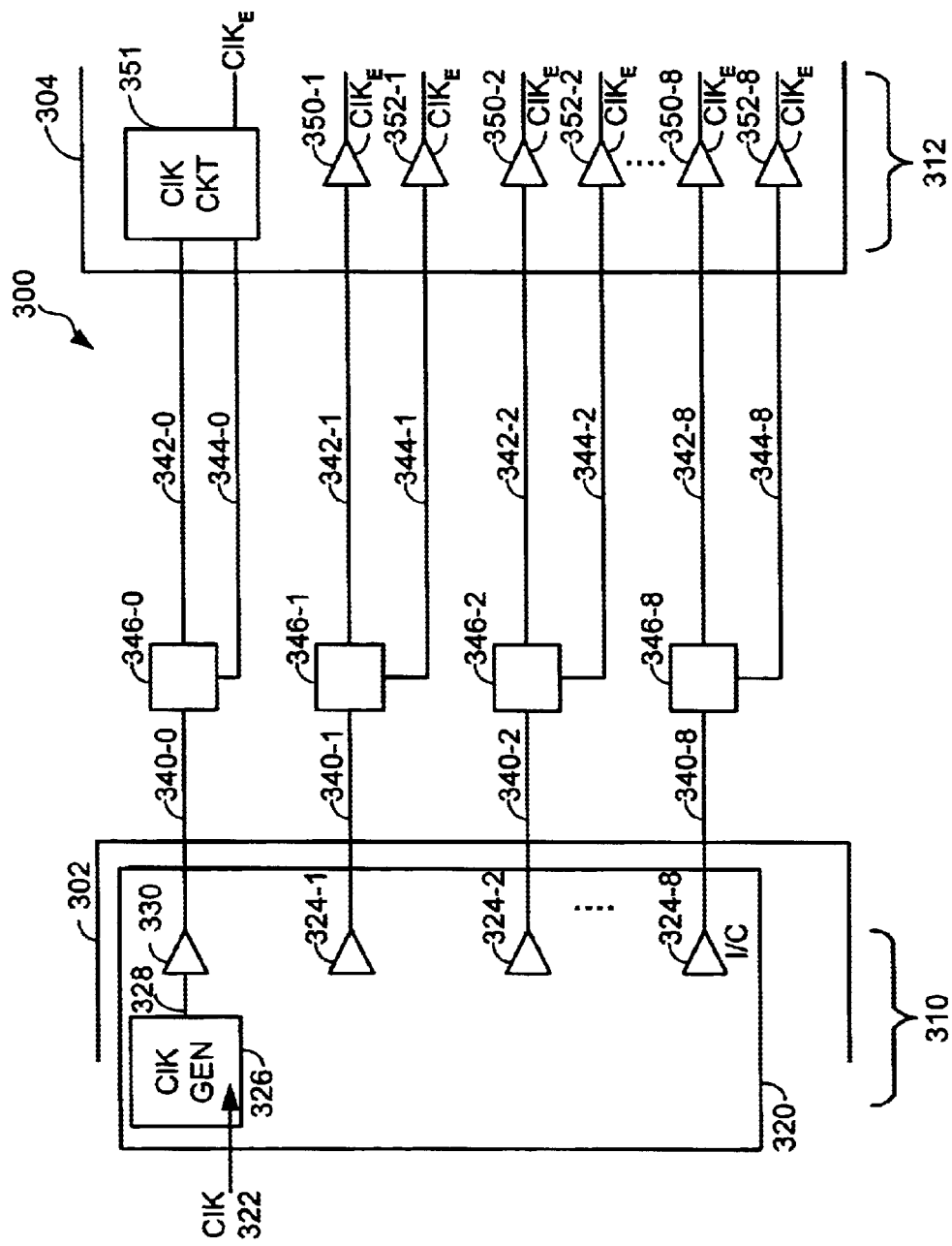
FIG. 3 is a schematic block diagram of a communications bus including modified transistor switches.

Referring now to FIG. 3, a redundant source synchronous computer system bus 300 is shown for transmitting signals from a first component 302 to a second component 304. The redundant source synchronous computer system bus 300 includes a transmitting portion 310 in first component 302 and a receiving portion 312 in second component 304 coupled by a transmission media 314.

Transmitting portion 310 includes an integrated circuit 320 operating at a core clock signal 322. Integrated circuit 320 includes a plurality of data drivers 324 and an external I/O clock generator 326. Each data driver 324 is operable to transmit a data signal from the first component 302 to the second component 304. The external I/O clock generator 306 generates an external I/O clock signal 328 for transmission to second component 304. The external clock signal 328 is coupled to a driver 330 that is substantially similar to the data drivers (324) used to transmit data signals from first component 302 to second component 304. As shown, source synchronous computer system bus includes 8 data lines and 1 clock signal line coupled between the first and second component. Those of ordinary skill in the art will recognize that other width data buses can be implemented as required.

Transmission media 314 couples first component 302 and 304. Transmission media includes first transmission line portion 340, second transmission line portion 342, third transmission line 344 and transistor switch 346. Transistor switch 346 couples a single first transmission media line portion 340 to both a second and third transmission line portions 342 and 344, respectively.

Receiving portion 312 of second component 304 includes redundant receivers (350 and 352) and a clock circuit 351. Clock circuit 351 processes clock signals received from either the second or third transmission line portions 342-0 and 344-0 respectively and provides a clocking signal $CLK_E$ that is in turn coupled to each receiver. Receiving portion 312 includes plural primary 350 and secondary receivers 352. Each primary receiver 350 is coupled to a second transmission line portion 342 of transmission media 314. Each secondary receiver 352 is coupled to a third transmission line portion of transmission media 314.

As described above, the data signals generated at the first component 302 can be switched between a primary and secondary receiver in the receiving portion 312 of second component 304. A failure in either the second or third transmission line portions 342 or 344 of the redundant source synchronous computer system bus can be recovered from by switching transistor switches 346.

In one implementation, the redundant source synchronous computer system bus 300 is used to couple plural circuit boards coupled by a backplane. Each circuit board can include a connection means (e.g., an edge connector) for coupling one or more signal channels to the back plane. In one implementation, the back plane includes switching circuitry (i.e., modified transistor switches) for switching individual signal channels received from a first circuit board to primary or redundant receivers in a second circuit board.

ALTERNATIVE IMPLEMENTATIONS

Coupling communication bus lines with the transistor switches as described above can produce multiple switching timing skews. Multiple switching timing skews can be minimized by staggering the arrival of any switching artifacts at the termination devices. In order to accomplish this, the transistor switches in the transmission media are staggered. That is, while the distance between the first and second component in any individual signal channel is approximately the same, the location of the transistor switch in the transmission media can be varied along the length of the transmission media. To avoid multiple output switching timing skews the lengths of the transmission lines are varied on the input and the output sides of each transistor switch.

Figure 4:
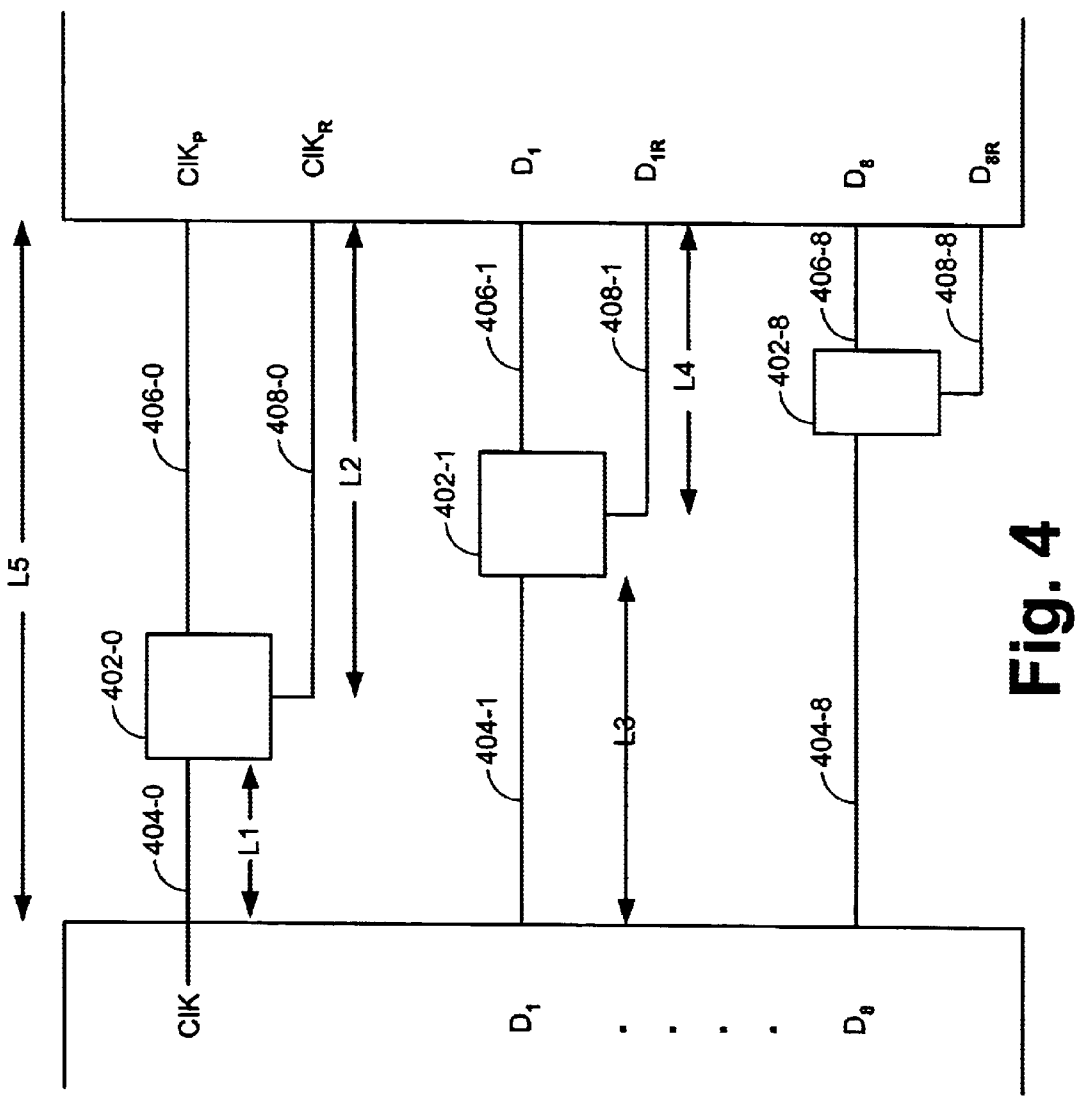
FIG. 4 is a schematic block diagram of an alternative configuration for a communications bus.

Referring now to FIG. 4, a redundant source synchronous computer system bus 400 is shown that includes plural transistor switches 402. Transistor switch 402-0 couples first transmission line 404-0 to second 406-0 and third transmission lines 408-0 respectively. The Similarly, transistor switch 402-1 couples first transmission line 404-1 to second 406-1 and third transmission lines 408-1 respectively. The length L1 and length L2 associated with the first transmission line 404-0 and 404-1 respectively can be varied, so that L1 does not equal L2. Accordingly, the lengths L3 and L4 will also vary (associated with second and third transmission lines 406-0, 408-0 and 406-1, 408-1, respectively). The overall length of the transmission media for each portion of the link remains constant at L5, such that L1+L3=L2+L4= L5. In one implementation, the separation between transistor switches in the transmission media (i.e., length differential between L1 and L2) is determined based on the transition time and edge rate for the communications link.

In one implementation, plural source synchronous buses are provided between a single sourcing device and one or more receiving devices. Where plural source synchronous busses are provided, timing skews from multiple output switching can arise. To avoid such issues, signals sourced from the same sourcing device (i.e., on different respective source synchronous busses) are staggered at the source. That is, from group to group in a single sourcing device (where a group represents a single source synchronous link), signals are staggered. Similarly, where a receiving device includes plural source synchronous links, receipt of signals can be staggered between groups to reduce timing skews. In another implementation, signals on signal lines in a same group can be staggered when sourced or upon receipt.

A transistor switch is conventionally packaged as a component in a device that includes plural components (i.e., plural transistor switches in a device). In one implementation, all of the communications channels for a single bus are coupled using a single device in order to minimize process variation performance issues. For example, an 8 bit wide communications bus that includes a clock signal can be switched between primary and redundant receivers in a redundant source synchronous computer system bus configuration using nine transistor switches (e.g., including a total of 18 FETs) from a single package.

In one implementation, in addition to matching lengths of transmission paths between a source and receiving device, geometry matching may also be performed to minimize reflection noise differences in transmission paths in a group. For example, line width, height and spacing can be matched in a group.

A number of embodiments of the invention have been described. Nevertheless, it will be understood that various modifications may be made without departing from the spirit and scope of the invention. Accordingly, other embodiments are within the scope of the following claims.

What is claimed is:

1. A redundant source synchronous communications bus coupling a first component and a second component, the first component including a clock source and one or more data channels where each data channel includes a transmitter, the second component including redundant termination systems for receiving signals generated in each data channel, the redundant source synchronous communications bus comprising:

(a) a plurality of first, second and third transmission line portions, each first transmission line portion being coupled to a transmitter in the first component; and (b) a like plurality of transistor switches, each transistor switch including an input port, two output ports and primary and redundant switches operable for switching a signal received from the first transmission line portion at the input port to either of the two output ports, each output port coupled by the second and third transmission line portions, respectively, to the redundant termination systems in the second component.

2. The redundant source synchronous bus of claim 1 further including a like plurality of bias circuits, each bias circuit coupled between an output of a transmitter for a data channel and ground.

3. The redundant source synchronous bus of claim 1 further including a like plurality of AC coupling capacitors, each AC coupling capacitor coupling the output of a transmitter for a data channel to one end of a first transmission line portion, where the second end of the first transmission line portion is coupled to the input port of a transistor switch.

4. The redundant source synchronous bus of claim 1 wherein a length of each first transmission line portion varies while an overall length between the first and second component is approximately equal for all data channels.

5. A system for coupling a first component and a second component, the first component including plural redundant source synchronous communication links, each link including a clock source and one or more data channels where each data channel includes a transmitter, the second component including plural redundant termination systems for receiving signals generated in each data channel, the system comprising:

(a) means for staggering signals generated on each source synchronous communication bus so that no two of the plural source synchronous communications busses are sourcing signals at a same time.

6. The system of claim 5 wherein each redundant source synchronous communications bus couples a first component and a second component, the first component including a clock source and one or more data channels where each data channel includes a transmitter, the second component including redundant termination systems for receiving signals generated in each data channel, and where the redundant source synchronous communications bus includes (a) a plurality of first, second and third transmission line portions, each first transmission line portion being coupled to a transmitter in the first component; and (b) a like plurality of transistor switches, each transistor switch including an input port, two output ports and primary and redundant switches operable for switching a signal received from the first transmission line portion at the input port to either of the two output ports, each output port coupled by the second and third transmission line portions, respectively, to the redundant termination systems in the second component.

7. The system of claim 6 further including a like plurality of bias circuits, each bias circuit coupled between an output of a transmitter for a data channel and ground.

8. The system of claim 6 further including a like plurality of AC coupling capacitors, each AC coupling capacitor coupling the output of a transmitter for a data channel to one end of a first transmission line portion, where the second end of the first transmission line portion is coupled to the input port of a transistor switch.

* * * * *